(12) United States Patent
Alm et al.

(10) Patent No.: US 7,758,287 B2
(45) Date of Patent: Jul. 20, 2010

(54) NEGATIVE INSERT FOR CUTTING MACHINING

(75) Inventors: Per Alm, Fagersta (SE); Carlos Bueno-Martinez, Fagersta (SE); Patrick Jonsson, Almunge (SE); Jan-Erik Stahl, Lund (SE); Mats Jonsson, Hedemora (SE)

(73) Assignee: Seco Tools AB, Fagersta (SE)

( * ) Notice: Subject to any disclaimer, the term of this patent is extended or adjusted under 35 U.S.C. 154(b) by 292 days.

(21) Appl. No.: 11/871,326

(22) Filed: Oct. 12, 2007

(65) Prior Publication Data

US 2008/0253848 A1  Oct. 16, 2008

(30) Foreign Application Priority Data

Oct. 13, 2006 (SE) .................... 0602156
Nov. 27, 2006 (SE) .................... 0602512

(51) Int. Cl.
*B23B 27/00* (2006.01)
*B23B 27/02* (2006.01)

(52) U.S. Cl. ...................... 407/113; 407/115

(58) Field of Classification Search ......... 407/113–116, 407/30, 33, 53
See application file for complete search history.

(56) References Cited

U.S. PATENT DOCUMENTS 4,189,265 A * 2/1980 Arnold et al. ............... 407/114
5,032,049 A * 7/1991 Hessman et al. ............ 407/113
5,639,189 A * 6/1997 Hoefler ...................... 407/113
5,921,722 A * 7/1999 Paya et al. .................. 407/114
5,971,672 A * 10/1999 Hansson ..................... 407/114
7,438,508 B2 * 10/2008 Alm et al. ................... 407/113
7,494,303 B2 * 2/2009 Koskinen .................... 407/113
2006/0269366 A1 * 11/2006 Rieth .......................... 407/113

FOREIGN PATENT DOCUMENTS

| DE | 10308234 A1 | 9/2004 |
| EP | 0349871 A1 | 6/1989 |
| EP | 1231004 A1 | 8/2002 |
| FR | 2172542 A | 9/1973 |
| WO | 9936217 A1 | 7/1999 |
| WO | 2006091144 A1 | 8/2006 |

OTHER PUBLICATIONS

International Search Report from corresponding International Application PCT/SE2007/050715.

* cited by examiner

*Primary Examiner*—Will Fridie, Jr.
(74) *Attorney, Agent, or Firm*—WRB-IP LLP

(57) ABSTRACT

A negative insert for cutting machining has a top side, a clearance side perpendicular thereto and a cutting edge in a region interconnecting these sides and extending substantially in parallel with these sides. The insert has further a flat or rounded chamfer connecting the cutting edge to the clearance side on at least one lateral side of the insert in the region of a corner thereof. The chamfer makes an angle of 1°-15° with the clearance side for enabling application of the chamfer substantially tangentially to a work piece to be machined for bearing of the insert in two dimensions against the work piece during cutting machining operation carried out by the insert.

21 Claims, 2 Drawing Sheets

NEGATIVE INSERT FOR CUTTING MACHINING

BACKGROUND AND SUMMARY

The present invention relates generally to a negative insert for cutting machining having a top side, a clearance side perpendicular thereto and a cutting edge in a region interconnecting these sides and extending substantially in parallel with these sides. The invention is generally directed to all types of negative inserts for cutting machining, such as inserts for turning as well as such for milling operation.

"Top side" is here defined as the side of the insert adapted to face opposite to the direction of rotation of a work piece to be machined by the insert in the case of a turning insert and the side adapted to face in the direction of rotation of the insert in the case of a milling insert. The axis of rotation of such a work piece is mostly horizontal, but should it for any reason not be horizontal the top side may have any orientation depending upon the direction of the axis of rotation. However, in this disclosure "uppermost" and other similar position definitions will relate to this top side as being on top of the insert.

Inserts for cutting machining with all types of negative geometries and of all conceivable types of material are included in the present specification. Inserts in the form of turning inserts will hereinafter be mainly discussed for illuminating the invention and the problem to be solved thereby without for that sake in any way restrict the invention thereto. The turning inserts often have more than one corner to engage a rotating work piece while being fixed in a tool holder for machining the work piece by a turning operation. When the wear of the uppermost flank of the clearance side has reached a predetermined level the required accuracy of the machining may not be guaranteed any longer, and the insert will in such a case be indexed in the tool holder for using another corner thereof for further turning operation. When the flank wear of all corners provided with a the cutting edge for turning operation have reached a certain width in this way the lifetime of the insert is expired.

The change, i.e., disposal, of such turning inserts is of course involved with costs, so that it is an on-going desire to prolong the life time of such inserts, for example by improving the properties of the material thereof.

Furthermore, variations of reaction forces of a rotating work piece machined by such an insert will give rise to vibrations in the insert and work piece, which may produce annoying noise and also will have a negative influence upon the result of the turning operation, i.e., increase the roughness of the generated surface. Another effect of vibrations could be reduced tool life.

In known turning inserts the cutting edge may be formed by a right angle corner interconnecting the top side and the clearance side, but it is also known to arrange a surface separating the cutting edge from the top side and making an angle to the top side of for instance 30° for strengthening the cutting edge and reducing the speed of the wear of the upper flank of the clearance side. The transition between the surface and the clearance side is then rounded off for improving the wear resistance and suppressing breaking of the insert in that region. Such an insert is known through for example U.S. Pat. No. 6,655,881.

It is desirable to provide an insert for cutting machining of the type defined in the introduction being improved in at least some aspect with respect to such negative inserts discussed above.

According to an aspect of the invention, the insert is provided with a flat or rounded chamfer connecting the cutting edge to the clearance side on at least one lateral side of the insert in the region of a corner thereof, and the chamfer makes an angle of 1°-15° with the clearance side for enabling application of the chamfer substantially tangentially to a work piece to be machined for bearing of the insert in two dimensions against the work piece during cutting machining operation carried out by the insert.

It has been found that such a chamfer extending the machining region of the insert during cutting machining operation to a surface results in a number of advantages with respect to negative inserts for cutting machining already known.

Vibrations of such an insert during cutting machining operation are remarkably reduced, especially in the tangential direction with respect to a work piece, which will rotate in the case of a turning insert. This results in an improved machining result, less wear upon the insert and less production of noise during the operation. The speed of the wear of the uppermost flank of the clearance side of the insert will also be reduced, so that a high accuracy machining may be carried out by the insert over a longer time within the tolerance range. Accordingly, need of adjustments in order to keep the accuracy at the machined work piece is reduced and the life time of the insert is prolonged, so that such inserts are not to be replaced as often as inserts already known.

U.S. Pat. No. 5,006,020 discloses a cutter insert having two bevels interconnecting the top side and the clearance side, but these are only made for strengthening the cutting edge, and the cutting edge is formed at the border of one of these bevels to the clearance side, and this bevel makes an angle of approximately 60° to the clearance side. Thus, this document does not show any chamfer being similar to or having a similar function to the chamfer in the insert according to the present invention.

According to an aspect of the invention the insert is a turning insert. Experiments have shown that vibrations of such a turning insert during turning operation are reduced remarkably.

According to another aspect of the invention the insert is a milling insert.

According to an aspect of the invention the chamfer makes an angle of 1°-10° or 3°-8° with the clearance side. It has been found that these are particularly suitable ranges for the angle of the chamfer for obtaining the advantages described above of an insert according to the invention.

According to another aspect of the invention the extension of the chamfer from the cutting edge to the clearance side is 0.03 mm-0.30 mm, 0.03 mm-0.20 mm, 0.04 mm-0.15 mm or 0.04 mm-0.08 mm. It has been found that a chamfer with an extension within these ranges will when applied substantially tangentially to a work piece to be machined enable efficient machining of the work piece thereby while achieving the advantages of less vibrations and reduced flank wear.

According to another aspect of the invention the chamfer is rounded with a radius r>10 mm, such as 10 mm<r<100 mm, 10 mm<r<50 mm or 10 mm<r<30 mm. A rounded or convex chamfer with such a radius exceeding 10 mm will result in a surface contact of the chamfer with respect to a work piece machined by the insert similar to a flat chamfer. The choice of a flat or such a rounded chamfer with such a large radius may be dependent upon the material intended to be machined by the insert.

According to another aspect of the invention the chamfer extends from the corner over at least substantially half the distance to an adjacent corner of the insert. This means that a cutting depth being up to half the distance between two adjacent corners of the insert may be chosen for cutting machining, such as turning operations carried out by use of the insert. The chamfer may also be arranged around substantially the entire top side of the insert, so that all corners thereof may be used for the operations.

According to another aspect of the invention the chamfer connects the cutting edge to the clearance side on both lateral sides of the insert joined by a the corner of the insert. It is preferred to have a the chamfer on both sides of a the corner for fully benefit from the advantages of the presence of such a chamfer during especially turning operations carried out.

According to another aspect of the invention the insert has a the chamfer connecting the cutting edge to the clearance side in the region of more than one corner of the insert, so that cutting machining, such as turning operations may be carried out while using more than one the corner of the insert and obtaining the advantages of the presence of such a chamfer.

According to another aspect of the invention the insert is provided with a convex wiper edge at least at one corner thereof, the wiper being defined by at least one radius. It is known that such a wiper geometry will reduce the roughness of the surface of the work piece machined with respect to a standard insert geometry having a rounded corner with one radius, and the wiper geometry in connection with the chamfer will improve the properties of the insert according to the invention even more.

According to another aspect of the invention at least the portions thereof intended to be applied to a work piece to be machined are made of boron nitride (BN). Boron nitride has physical properties making it well suited as a material for especially turning inserts, and it has turned out that inserts of this material having a chamfer according to the above gives rise to an excellent behaviour when carrying out cutting machining, especially turning operations thereby. The boron nitride is then preferably cubic boron nitride (CBN), but poly crystalline boron nitride (PCBN) is also advantageous.

According to another aspect of the invention the insert has a surface separating the cutting edge from the top side and making an angle to the top side of less than 40°.

Further advantages and advantageous features of the invention appear from the following description.

BRIEF DESCRIPTION OF THE DRAWINGS

With reference to the appended drawings, below follows a specific description of negative inserts in the form of turning inserts according to aspects of the invention cited as examples.

In the drawings.

DETAILED DESCRIPTION

Figure 1:
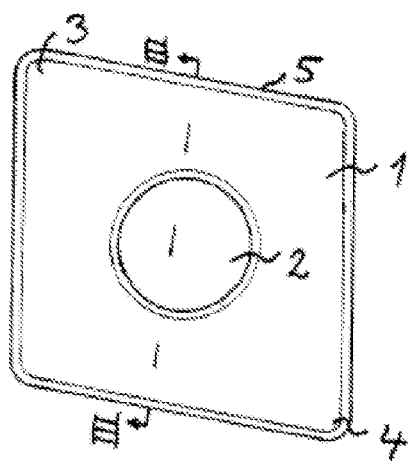
FIG. 1 is a view from above of a negative turning insert according to the invention.

FIG. 1 shows a negative turning insert 1 having a geometry typical for such an insert, and which is adapted to be secured in a tool holder by appropriate means, such as tightening means, while using a recess 2 therein. Such a recess is not necessary, but the insert may be without a recess and held in the tool holder by a clamp. The insert will machine a work piece by the region of a corner thereof, and it is preferably of the type enabling such machining by use of more than one such corner, such as at least the corners 3 and 4, so that the position of the insert in the tool holder may be changed when the accuracy of the machining may not be guaranteed any longer when using a certain corner region for such machining. The dimensions of the lateral sides 5 of the insert are preferably so that adjacent corners may be used for machining, which means that the cutting depths may then not be larger than half the distance between such two adjacent corners, so that for instance for an insert having such a distance of 12 mm cutting depths of above 0 to 6 mm may be accomplished. This is all conventional technique.

Figure 2:
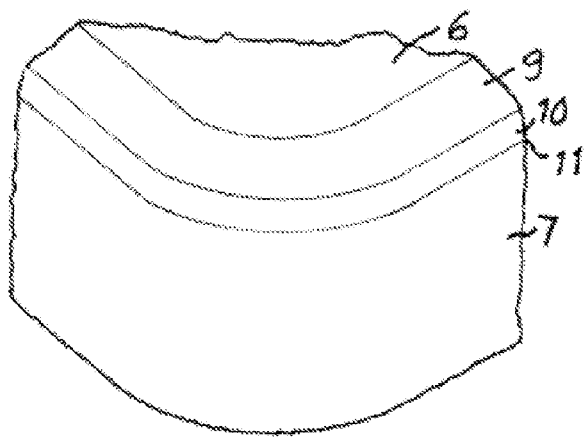
FIG. 2 is a perspective view of a corner of an insert according to a first aspect of the invention.

The design of a negative turning insert according to an embodiment of the invention will now be described while making reference to FIGS. 2 and 3. The insert has a top side 6, a clearance side 7 perpendicular thereto, which corresponds to the definition of a negative turning insert, and a cutting edge 8 in a region interconnecting these sides and extending substantially in parallel with these sides.

A surface 9 separating the cutting edge 8 from the top side is provided around the top side, and this surface makes an angle to the top side of approximately 30°. Such a surface 9 is also there in negative turning inserts known. The insert further comprises a flat chamfer 10 connecting the cutting edge 8 to the clearance side 7 on at least one lateral side of the insert in the region of the corner thereof, and this chamfer extends all around the top side in the insert shown in FIG. 2. The chamfer makes an angle α of 6° (slightly exaggerated in the figures for the sake of clearness) with the clearance side 7. The extension of the chamfer from the cutting edge 8 to the upper border 11 of the clearance side is here 0.06 mm and may be in the range of 0.03 mm-0.30 mm and is preferably in the range of 0.04 mm-0.08 mm.

The insert is preferably made of sintered boron nitride (BN), especially of cubic boron nitride (CBN), but it may also be of poly crystalline boron nitride (PCBN). However, the invention should not be restricted to the use of this material for the insert, but other materials suited for such inserts, such as cemented carbide, are conceivable.

Figure 4:
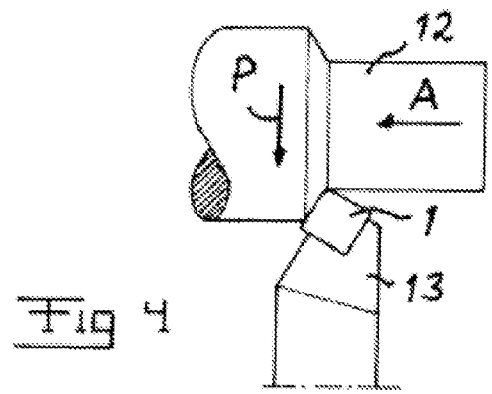
FIG. 4 is a simplified perspective view illustrating the insert according to the invention in use for carrying out a turning operation.

It is shown in FIG. 4 how an insert 1 of this type is typically applied to a work piece 12 rotating in the direction of the arrow P for carrying out turning operation thereupon. The insert 1 is secured in a tool holder 13 which is adapted to position the insert to bear against the work piece for obtaining a desired machining result, such as cutting depth.

Figure 5:
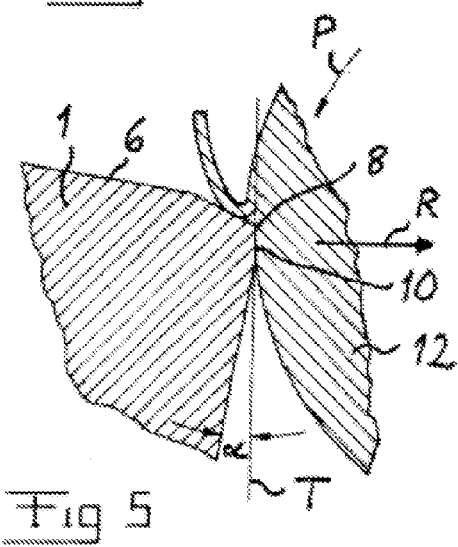
FIG. 5 is a cross-sectional view illustrating how the insert is applied on a work piece to be machined for carrying out a turning operation.

It is shown in FIG. 5 how the tool holder 13 may apply the insert 1 according to the invention to the work piece 12 so that the chamfer 10 will be directed substantially tangentially to the work piece and the insert will bear in two dimensions against the work piece during turning operation carried out by the insert. This means that the top side 6 of the insert will be inclined with respect to a perpendicular to the tangent T of the work piece with an angle being the same as the angle α between the chamfer 10 and the clearance side 7.

It has turned out that the flank wear of the clearance side, i.e., the wear of the region below the point 11 of the clearance side, is by this design reduced with respect to negative turning inserts already known having no such chamfer. Trials have shown that with a chamfer of 0.06 mm extension the flank wear was after a run of 25 minutes with certain cutting data and in a certain work piece material 0.19 mm, while it was 0.30 mm for the same conditions for a known insert having no the chamfer. This means that an insert according to the invention may be used to machine a work piece during a longer time within a determined tolerance range. The acceptable flank wear may for some type of machining be 0.10 mm, whereas it may for another type of machining be 0.30 mm. An insert according to the present invention results for all these types in a longer possible lifetime thereof.

Figure 7:
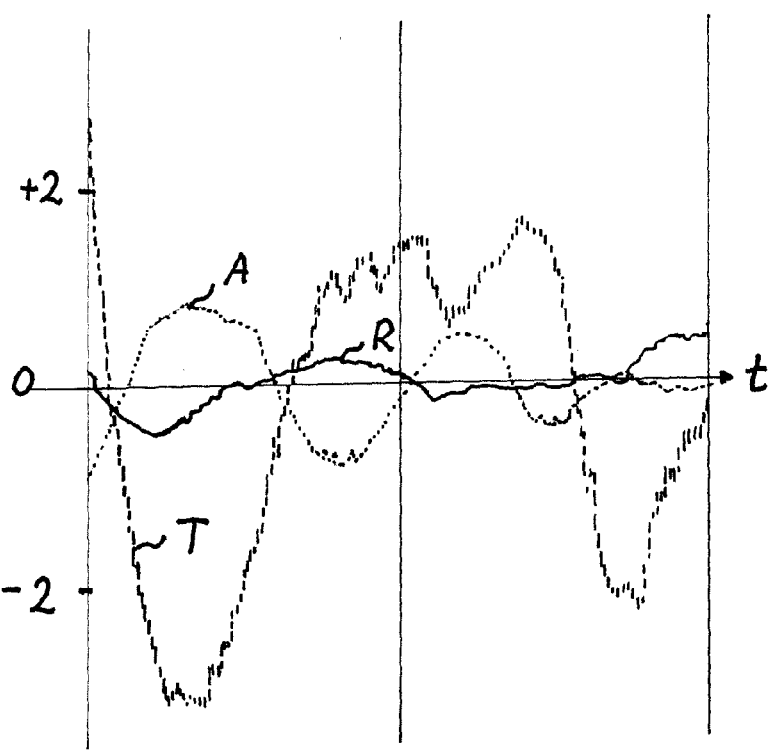
FIG. 7 is a graph illustrating the position of the tip of an insert already known in axial, radial and tangential direction versus time during turning operation.

FIG. 7 is a graph of the position of a tip of a known insert without a chamfer on the clearance side thereof in μm versus time t during turning operation in axial (A), radial (R) and tangential (T) direction with respect to the work piece (see FIGS. 4 and 5).

Figure 8:
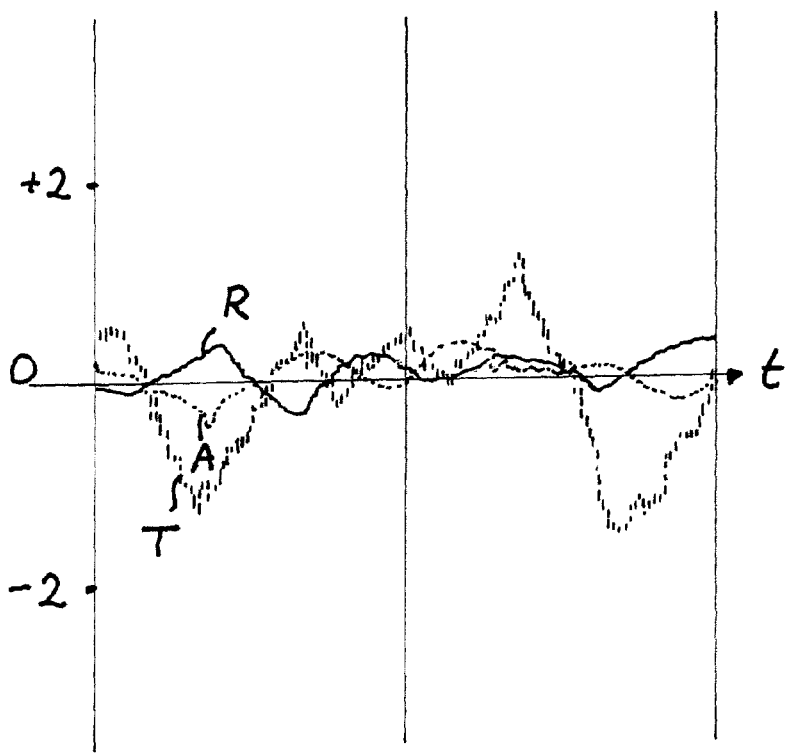
FIG. 8 is a graph corresponding to the graph of FIG. 7 for an insert according to the present invention.

FIG. 8 is a corresponding graph resulting from measurements carried out for an insert with chamfer on the clearance side according to the present invention. It is shown that the movement of the insert tip is reduced by approximately 50% in the tangential direction and also noticeably in the axial direction. Thus, vibrations of the insert during turning operation are remarkably reduced by an insert according to the present invention resulting in the advantages mentioned above.

Figure 6:
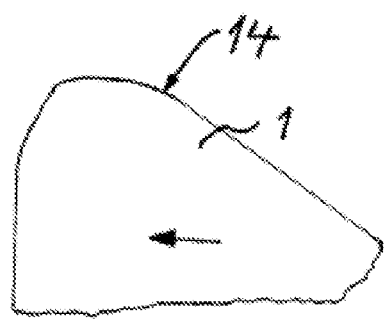
FIG. 6 is a view from above of a corner of an insert according to a second aspect of the invention.

FIG. 6 illustrates very schematically how an insert according to the present invention may have at least one convex wiper edge 14 at a corner thereof making it possible to improve the result of the machining even more. The wiper edge is defined by several radii that have different points of origin.

Accordingly, an insert according to the present invention is especially suitable to be used where the demands on the quality of the surface of a work piece resulting by the turning operation is high and it is important to reduce vibrations of the tool tip as much as possible. Another important property of an insert according to the invention is the prolongation of the time during which it may guarantee a satisfying machining result within a narrow tolerance range.

The invention is of course not in any way restricted to the embodiments described above, but many possibilities to modifications thereof will be apparent to a person with ordinary skill in the art without departing from the scope of the invention as defined in the appended claims.

Figure 3:
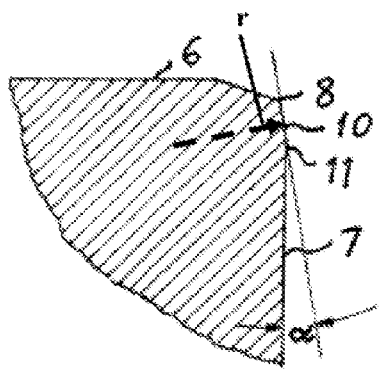
FIG. 3 is a cross-sectional view taken along III-III in FIG. 1 showing only the upper region of the insert according to FIG. 2.

As mentioned above, the chamfer may be rounded with a radius r exceeding 10 mm, such as 10 mm<r<100 mm, 10 mm≦r<50 mm or 10 mm<r<30 mm as seen by the broken radius r in FIG. 3. in FIG.

The insert may for instance have a totally other geometry than the one shown in FIG. 1, and it may have any conceivable round or polygonal shape.

The surface 9 connecting the cutting edge and the top side has not to be there, but the cutting edge may form the border to the top side.

As already mentioned, an insert according to the invention may be designed for other cutting machining operation than turning, such as milling.

The disclosures in Swedish patent application Nos. 0602156-2 and 0602512-6, from which this application claims priority, are incorporated herein by reference.

The invention claimed is:

1. A negative insert for cutting machining having a top side, a bottom side, a clearance side perpendicular to the top side and extending around an entire periphery of the insert and between the top side and the bottom side, and a cutting edge between the top side and the clearance side, wherein a flat or rounded chamfer connects the cutting edge to the clearance side on at least one lateral side of the insert in the region of a corner thereof, and the chamfer makes an angle of 1°-15° with the clearance side for enabling application of the chamfer substantially tangentially to a work piece to be machined for bearing of the insert in two dimensions against the work piece during cutting machining operation carried out by the insert.

2. An insert according to claim 1, wherein the insert is a turning insert.

3. An insert according to claim 1, wherein the insert is a milling insert.

4. An insert according to claim 1, wherein the chamfer makes an angle of 1°-10° or 3°-8° with the clearance side.

5. An insert according to claim 1, wherein the chamfer makes an angle of 1°-10° or 3°-8° with the clearance side.

6. An insert according to claim 1, wherein the extension of the chamfer from the cutting edge to the clearance side is 0.03 mm-0.30 mm.

7. An insert according to claim 1, wherein the extension of the chamfer from the cutting edge to the clearance side is 0.03 mm-0.20 mm.

8. An insert according to claim 1, wherein the extension of the chamfer from the cutting edge to the clearance side is 0.04 mm-0.15 mm.

9. An insert according to claim 1, wherein the extension of the chamfer from the cutting edge to the clearance side is 0.04 mm-0.08 mm.

10. An insert according to claim 1, wherein the chamfer is rounded with a radius r>10 mm.

11. An insert according to claim 1, wherein the chamfer is rounded with a radius r, where 10 mm<r<100 mm.

12. An insert according to claim 1, wherein the chamfer is rounded with a radius r, where [r] 10 mm<r<50 mm.

13. An insert according to claim 1, wherein the chamfer extends from the corner over at least substantially half the distance to an adjacent corner of the insert.

14. An insert according to claim 1, wherein the chamfer connects the cutting edge to the clearance side on both lateral sides of the insert joined by the corner of the insert.

15. An insert according to claim 1, wherein the insert has a chamfer connecting the cutting edge to the clearance side in the region of more than one corner of the insert.

16. An insert according to claim 1, wherein it is provided with a convex wiper edge at least at one corner thereof, the wiper edge being defined by at least one radius.

17. An insert according to claim 1, wherein at least the portions thereof intended to be applied to a work piece to be machined are made of boron nitride.

18. An insert according to claim 17, wherein the boron nitride is cubic boron nitride.

19. An insert according to claim 17, wherein the boron nitride is poly crystalline boron nitride.

20. An insert according to claim 1, wherein the insert has a surface separating the cutting edge from the top side and making an angle to the top side of less than 40°.

21. An insert according to claim 1, wherein the chamfer is convexly rounded.

* * * * *